(12) United States Patent
Inomori et al.

(10) Patent No.: US 8,317,009 B2
(45) Date of Patent: Nov. 27, 2012

(54) CENTRIFUGAL MULTI-PLATE FRICTION CLUTCH AND VEHICLE EQUIPPED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 610 days.

(21) Appl. No.: 12/570,917

(22) Filed: Sep. 30, 2009

(65) Prior Publication Data

US 2010/0089680 A1 Apr. 15, 2010

(30) Foreign Application Priority Data

Oct. 10, 2008 (JP) .................. 2008-264598

(51) Int. Cl.
*F16D 43/12* (2006.01)
*F16D 13/52* (2006.01)

(52) U.S. Cl. .................. 192/83; 192/70.28; 192/105 B

(58) Field of Classification Search .................. 192/83, 192/105 B, 103 A, 70.28, 85.4, 85.41, 85.5
See application file for complete search history.

(56) References Cited

U.S. PATENT DOCUMENTS

| 834,499 A | * | 10/1906 | Sturtevant et al. | ........ 192/105 B |
| 3,006,449 A | | 10/1961 | Binder | |
| 3,584,720 A | * | 6/1971 | Bark et al. | ................. 192/70.28 |
| 4,548,306 A | * | 10/1985 | Hartz | ......................... 192/70.28 |
| 7,140,480 B2 | | 11/2006 | Drussel | |

FOREIGN PATENT DOCUMENTS

| EP | 2 009 310 A2 | 12/2008 |
| EP | 2 009 311 A2 | 12/2008 |
| FR | 2 760 058 A1 | 8/1998 |
| JP | 59-13139 A * | 1/1984 |
| JP | 60-18623 A | 1/1985 |
| WO | 2006/006437 A1 | 1/2006 |

OTHER PUBLICATIONS

Official Communication issued in corresponding European Patent Application No. 09 01 2762, completed on Feb. 17, 2011.

* cited by examiner

*Primary Examiner* — Richard M. Lorence
(74) *Attorney, Agent, or Firm* — Keating & Bennett, LLP

(57) ABSTRACT

According to some preferred embodiments, a clutch housing (46) of a clutch (2) has a bottom portion (46a) in a closed-end cylindrical shape, a plurality of arms (46d) extending along an axial direction from the bottom portion (46a) and provided along a circumferential direction centering on an axial center (C) of the clutch shaft (33), and a plurality of gaps (46e) formed between adjacent arms (46d). Off-springs (71) are arranged in the gaps and extend along the axial direction.

10 Claims, 15 Drawing Sheets

CENTRIFUGAL MULTI-PLATE FRICTION CLUTCH AND VEHICLE EQUIPPED WITH THE SAME

This application claims priority to Japanese Patent Application No. 2008-264598 filed on Oct. 10, 2008, the entire disclosure of which is incorporated herein by reference in its entirety.

BACKGROUND

1. Field of the Invention

The preferred embodiments of the present invention relate, inter alia, to a centrifugal multi-plate friction clutch and a vehicle equipped with the clutch.

2. Description of the Related Art

The following description sets forth the inventor's knowledge of related art and problems therein and should not be construed as an admission of knowledge in the prior art.

Multi-plate friction clutches are conventionally known. A multi-plate friction clutch has clutch plates and friction plates arranged alternately along the axis of a clutch shaft, and a pressure plate for making the clutch plates and the friction plates come in contact with each other. A multi-plate friction clutch having a clutch release mechanism for moving the pressure plate is also known. A multi-plate friction clutch equipped with centrifugal weights is also known. Hereinafter, this type of clutch is referred to as a "centrifugal multi-plate friction clutch." The centrifugal weights rotate around the clutch shaft together with a clutch housing. At this time, receiving centrifugal force, the centrifugal weights move away from the clutch shaft. The centrifugal multi-plate friction clutch has elastic bodies for adjusting the force for pressing the pressure plate against the clutch plates and the friction plates. Adjusting the aforementioned force enables adjustment of the point of the clutch engagement/disengagement, i.e., the so-called "meet point."

U.S. Pat. No. 7,140,480 (Patent Document 1) discloses a centrifugal multi-plate friction clutch having elastic bodies arranged axially outward of an end of a clutch shaft.

The clutch disclosed in Patent Document 1 has a problem that the length of the clutch along its axis needs to be longer if a longer elastic body is desired. As a consequence, it is often difficult to select an appropriate size of the elastic body because it is necessary to prevent the clutch from increasing in size.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a centrifugal multi-plate friction clutch capable of using a relatively long elastic body.

Among other potential advantages, some embodiments can provide a vehicle equipped with a centrifugal multi-plate friction clutch capable of using a relatively long elastic body.

According to a first aspect preferred embodiment of the present invention, a centrifugal multi-plate friction clutch comprises: a clutch shaft; a clutch boss attached to the clutch shaft; a clutch housing including a bottom portion in a closed-end cylindrical shape surrounding the clutch boss, a plurality of arms extending along an axial direction of the clutch shaft from the bottom portion and provided along a circumferential direction centering on the axial center of the clutch shaft, and a plurality of gaps each formed between the arms that are adjacent to each other along the circumferential direction, the clutch housing being configured to rotate in the circumferential direction; a plurality of first plates attached to the clutch boss and arranged along the axial direction; a plurality of second plates attached to the clutch housing and arranged along the axial direction alternately with the plurality of first plates; centrifugal weights configured to receive centrifugal force by rotating with the clutch housing and move in a direction away from the axial center of the clutch shaft; a cam mechanism for converting the centrifugal force into a force in the axial direction by contacting with the centrifugal weights; a pressure plate configured to move toward one side in the axial direction by receiving the force in the axial direction to make the first plates and the second plates come into contact with one another; a clutch release mechanism for moving the pressure plate toward the other side in the axial direction; a clutch operator for operating the clutch release mechanism; and a plurality of elastic bodies, arranged in the gaps of the clutch housing, for urging the pressure plate toward the other side in the axial direction.

According to a second aspect preferred embodiment of the present invention, a vehicle is equipped with the aforementioned centrifugal multi-plate friction clutch.

According to the preferred embodiments of the present invention, it is possible to provide a centrifugal multi-plate friction clutch capable of using a relatively long elastic body for adjusting the pressing force of a pressure plate, and a vehicle equipped with the clutch.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, a motorcycle 1 equipped with a friction clutch according to an embodiment will be described in detail with reference to the drawings. It should be understood, however, that the motorcycle 1 and a clutch 2 described below are merely illustrative of the preferred embodiments of the present invention. The vehicle according to the present invention is not limited to the motorcycle 1 described below. The vehicles according to the present invention are not limited to motorcycles, including the so-called sport-type motorcycle, a moped, and a motor scooter, but can be other types of vehicles, such as, e.g., ATVs (All Terrain Vehicles). In the present invention, the term "motorcycle" refers to a vehicle whose body is to be leaned when taking a turn. The number of wheels of the motorcycle is not limited to two, but can be three or more.

Figure 1:
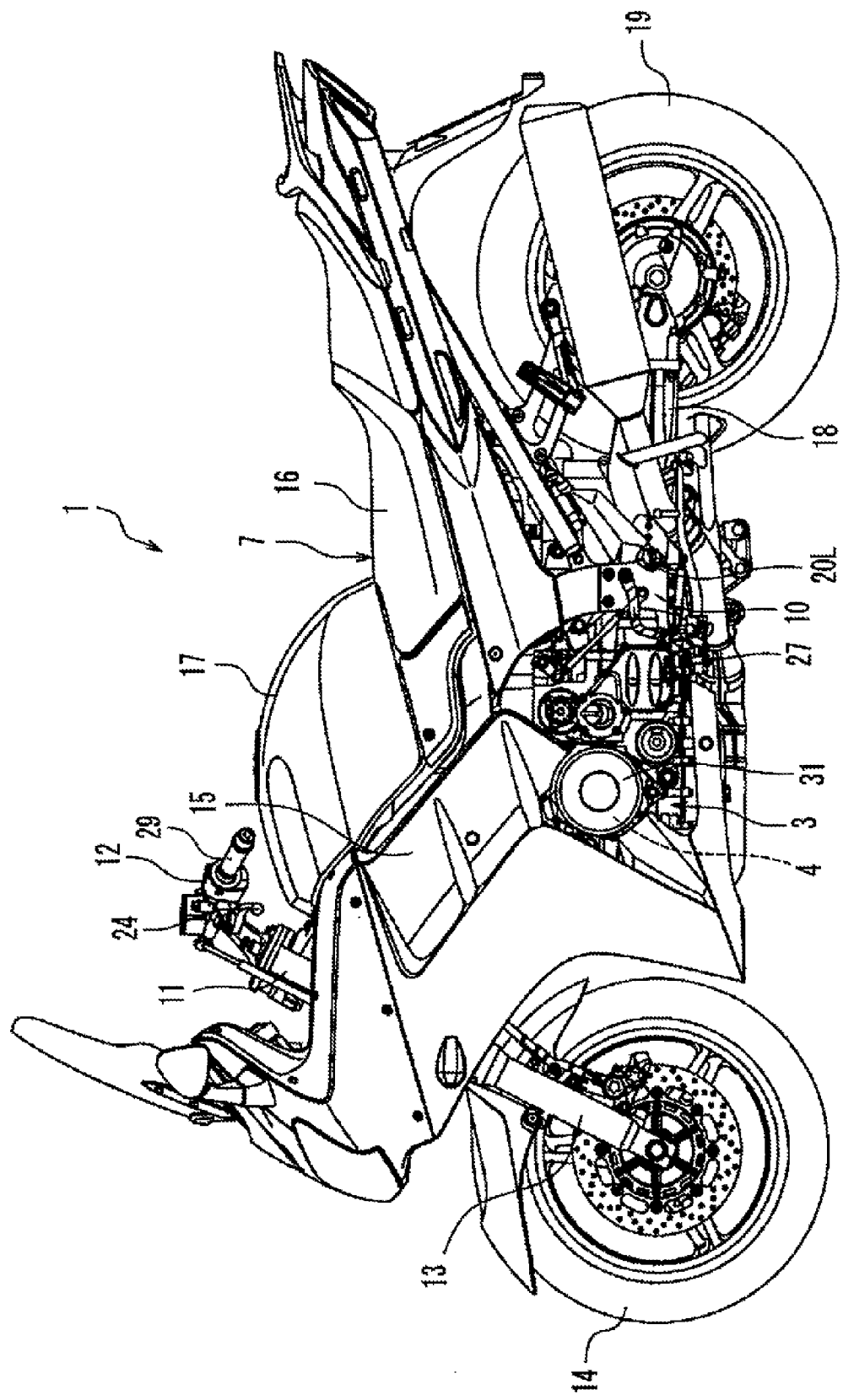
FIG. 1 is a side view of a motorcycle equipped with a centrifugal multi-plate friction clutch according to an embodiment of the present invention.

FIG. 1 is a left side view of a motorcycle 1. In the following description, the front, rear, right and left directions refer to the respective directions seen from the rider sitting on a seat 16.

Structure of Motorcycle:

As illustrated in FIG. 1, the motorcycle 1 includes a vehicle body 7, a front wheel 14 provided in front of the vehicle body 7, and a rear wheel 19 provided at the rear of the vehicle body 7. The vehicle body 7 includes a vehicle body frame 10. The vehicle body frame 10 has a head pipe 11. A handle bar 12 is attached to the upper end of the head pipe 11. A front wheel 14 is attached rotatably to the lower end of the head pipe 11 via front forks 13.

A power unit 3 is suspended from the vehicle body frame 10. A body cover 15 is attached to the vehicle body frame 10. A seat 16 is arranged behind the central part of the vehicle body 7. A fuel tank 17 is arranged in front of the seat 16.

A rear arm 18 is supported pivotally by the vehicle body frame 10. A rear wheel 19 is attached rotatably to a rear end part of the rear arm 18. The rear wheel 19 is coupled to an engine 4 (see FIG. 2) via a power transmission mechanism, which is not illustrated in the drawing. Thereby, the power of the engine 4 is transmitted to the rear wheel 19 to rotate the rear wheel 19.

An accelerator grip, not shown in the drawing, is provided on the right side of the handle bar 12. A left grip 29 is provided on the left side of the handle bar 12. A clutch lever 24, which is to be operated for engaging/disengaging a clutch 2 (see FIG. 2), is provided in front of the left grip 29.

Footrests 20 are provided on both the left and right sides of the vehicle body 7. A shift pedal 27, which is to be operated when changing the transmission gear ratio of a transmission device 5 (see FIG. 2), is provided in front of the left side footrest 20L.

Figure 2:
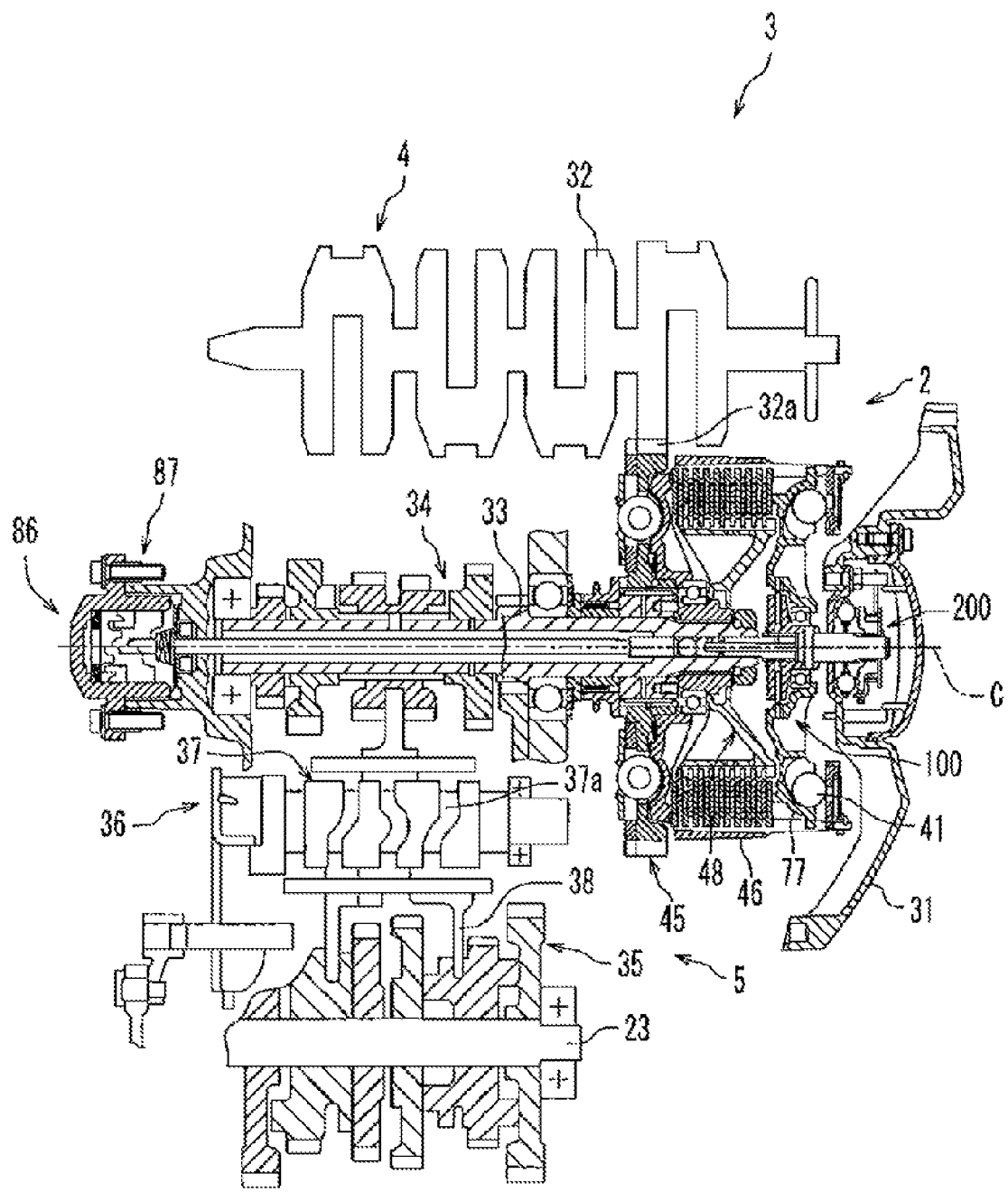
FIG. 2 is a structural view showing primary elements of a power unit of the motorcycle.

Structure of Power Unit:

As illustrated in FIG. 2, the power unit 3 is equipped with an engine 4, a transmission device 5, and a clutch 2. The type of the engine 4 is not particularly limited. In this embodiment, the engine 4 is a water-cooled, four-stroke parallel four-cylinder engine.

Although not shown in the drawings, the engine 4 has four cylinders, pistons that reciprocate inside the cylinders, and a crankshaft 32 coupled to the pistons via connecting rods. The crankshaft 32 extends along a vehicle width direction. Reference numeral "31" denotes a crankcase.

The crankshaft 32 is connected to the transmission device 5 via the clutch 2. The transmission device 5 is equipped with a main shaft 33, a drive shaft 23, and a gear selection mechanism 36. The main shaft 33 is connected to the crankshaft 32 via the clutch 2. The main shaft 33 and the drive shaft 23 are arranged in parallel with the crankshaft 32.

A plurality of transmission gears 34 are attached to the main shaft 33. A plurality of transmission gears 35 corresponding to the plurality of transmission gears 34 are attached to the drive shaft 23. The transmission gears 35 mesh with the transmission gears 34 mutually only by a pair of selected gears. At least one of unselected transmission gears 34 and 35 is capable of rotating with respect to the main shaft 33 or the drive shaft 23. The power transmission between the main shaft 33 and the drive shaft 23 is performed only via the selected transmission gears 34 and 35.

The selection of the transmission gears 34 and 35 is performed by the gear selection mechanism 36. A plurality of cam grooves 37a are formed in the outer circumferential surface of a shift cam 37. A shift fork 38 is attached to each of the cam grooves 37a. Each shift fork 38 is engaged with a predetermined transmission gear 34 of the main shaft 33 and a predetermined transmission gear 35 of the drive shaft 23. In response to rotation of the shift cam 37, each of the plurality of the shift forks 38 is guided by the cam groove 37a, and moves in an axial direction of the main shaft 33. As a result, a pair of mutually engaged gears is selected out of the transmission gears 34 and 35. The gear selection mechanism 36 is operated by the shift pedal 27 (see FIG. 1).

With such a structure, when the engine 4 is operated after bringing the clutch 2 in a connected state, the power of the engine 4 is transmitted to the main shaft 33 via the clutch 2. Via a pair of predetermined transmission gears 34 and 35, the power is transmitted from the main shaft 33 to the drive shaft 23, allowing the drive shaft 23 to rotate. As the drive shaft 23 rotates, the power is transmitted to the rear wheel 19 via a transmission mechanism (not shown), such as, e.g., a chain, connected to the drive shaft 23 and the rear wheel 19. As a result, the rear wheel 19 rotates.

Figure 3:
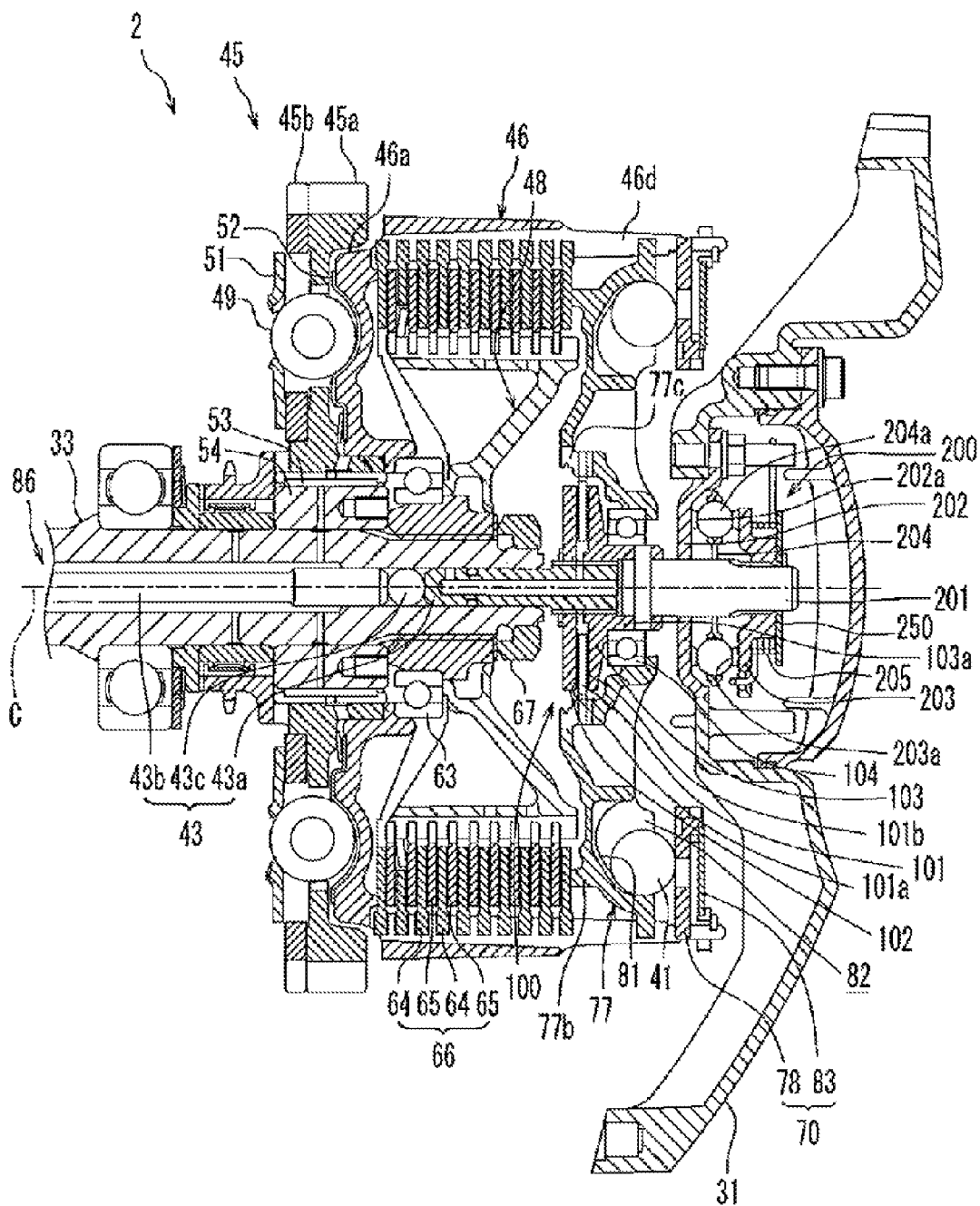
FIG. 3 is a cross-sectional view of the clutch.

The vehicle width direction means a lateral direction. The axial direction of the main shaft 33 also means a lateral direction. Hereinafter, the axial direction of the main shaft 33 will be referred to simply as "the axial direction." As illustrated in FIG. 3, since the clutch 2 is arranged on the right side of the main shaft 33, the outside of the vehicle width direction means the right side, and the inside of the vehicle width direction means the left side. In the following description, the outside and inside of the vehicle width direction will be referred to simply as "the right side" and "the left side," respectively.

Structure of Clutch:

The clutch 2 is constituted by a wet-type multi-plate friction clutch. The clutch 2 is a centrifugal clutch that is automatically engaged/disengaged at the time of starting or stopping the motorcycle 1. The clutch 2 is engaged/disengaged by the rider's operation of the clutch lever 24. It should be noted, however, that the clutch 2 can be a dry-type multi-plate friction clutch.

a. Clutch Housing

As illustrated in FIG. 3, the clutch 2 is provided with a clutch housing 46. The clutch housing 46 is manufactured by casting. However, the method for manufacturing the clutch housing 46 is not limited to casting. A main shaft 33 penetrates through the clutch housing 46. An end part of the main shaft 33 constitutes the clutch shaft. The axial center of the clutch housing 46 is in agreement with the axial center C of the main shaft 33.

Figure 5:
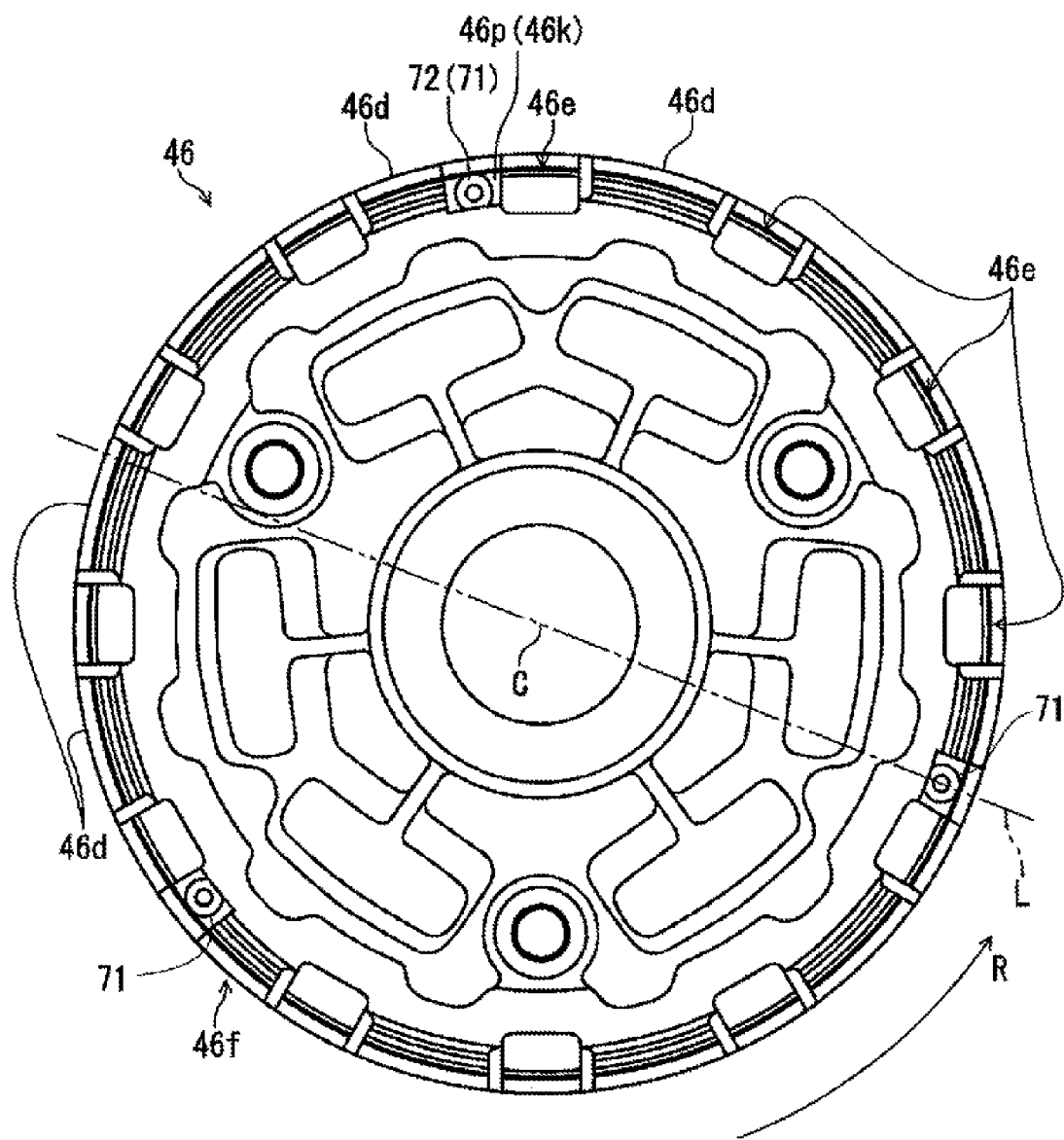
FIG. 5 is a front view of a clutch housing of the clutch.
Figure 6:
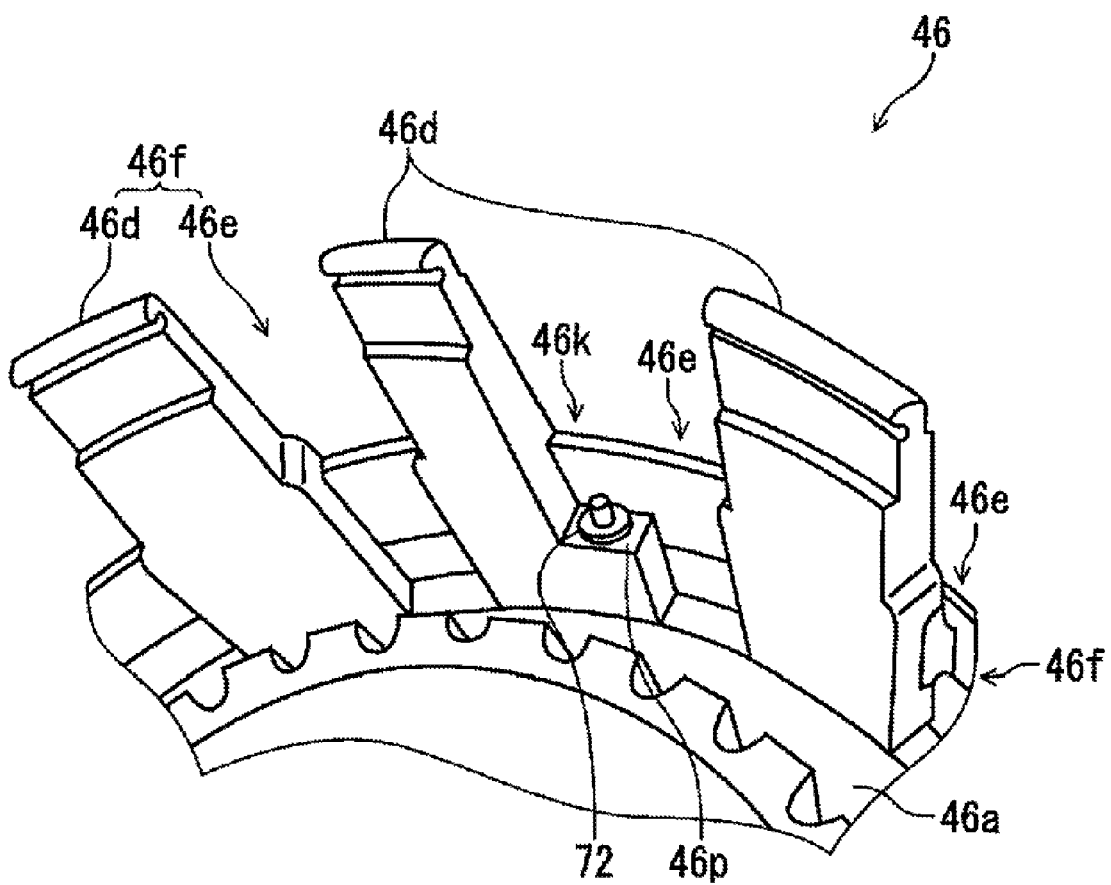
FIG. 6 is a perspective view showing a part of the clutch housing, viewed from obliquely above.

The clutch housing 46 has a bottom portion 46*a*. The bottom portion 46*a* is in a closed-end cylindrical shape. Thus, the clutch housing 46 is in a substantially cylindrical shape with one end closed by the bottom portion 46*a*. The main shaft 33 penetrates through the bottom portion 46*a*. As illustrated in FIGS. 5 and 6, the clutch housing 46 is provided with a plurality of arms 46*d*. These arms 46*d* are arranged along the circumference direction centering on the axial center C of the main shaft 33. Each arm 46*d* extends to the right from the bottom portion 46*a*. Gaps 46*e* are formed between respective two adjacent arms 46*d*.

b. Scissors Gear

As illustrated in FIG. 3, a scissors gear 45 is attached to the clutch housing 46. The scissors gear 45 includes two gears 45*a* and 45*b*, a spring 49, and two plates 51 and 52. The gear 45*a* and the gear 45*b* are located between the plates 51 and 52. The gear 45*a* and the gear 45*b* are configured to prevent their relative movements along the axial direction but to allow relative rotation along the circumferential direction.

The gear 45*a* meshes with a gear 32*a* (see FIG. 2) of the crankshaft 32. The gear 45*a* is configured to prevent its relative rotation with respect to the bottom portion 46*a* of the clutch housing 46. In response to rotation of the crankshaft 32, the gear 45*a* and the clutch housing 46 rotate integrally.

A needle bearing 53 and a spacer 54, which does not rotate relative to the main shaft 33, are arranged between the scissors gear 45 and the main shaft 33. The scissors gear 45 is capable of rotating relative to the main shaft 33 via the needle bearing 53. In other words, rotation of the scissors gear 45 is not directly transmitted to the main shaft 33.

c. Clutch Boss

As illustrated in FIG. 3, a clutch boss 48 is fixed to the main shaft 33 with a nut 67. The clutch boss 48 rotates together with the main shaft 33. A thrust bearing 63 is arranged between the clutch boss 48 and the scissors gear 45. Thereby, the scissors gear 45, the needle bearing 53, and the spacer 54 are inhibited from coming closer to the clutch boss 48 more than a predetermined distance. In other words, movements of the scissors gear 45, the needle bearing 53, and the spacer 54 toward the clutch boss 48 are inhibited. The clutch boss 48 is arranged radially inward of the clutch housing 46.

d. Plate Group

A plurality of friction plates 64 are arranged inside the clutch housing 46. The friction plates 64 are arranged along the axial direction. Each of the friction plates 64 rotates together with the clutch housing 46. Each of the friction plates 64 can change its position along the axial direction. For this reason, the gap between adjacent friction plates 64 is variable. Clutch plates 65 are interleaved between the respective adjacent friction plates 64. The clutch plates 65 face the friction plates 64. Each of the clutch plates 65 rotates together with the clutch boss 48. Each of the clutch plates 65 can change its position along the axial direction, and the gap between adjacent clutch plates 65 is variable. In this embodiment, a plate group 66 is constituted by the friction plates 64 and the clutch plates 65.

Figure 7:
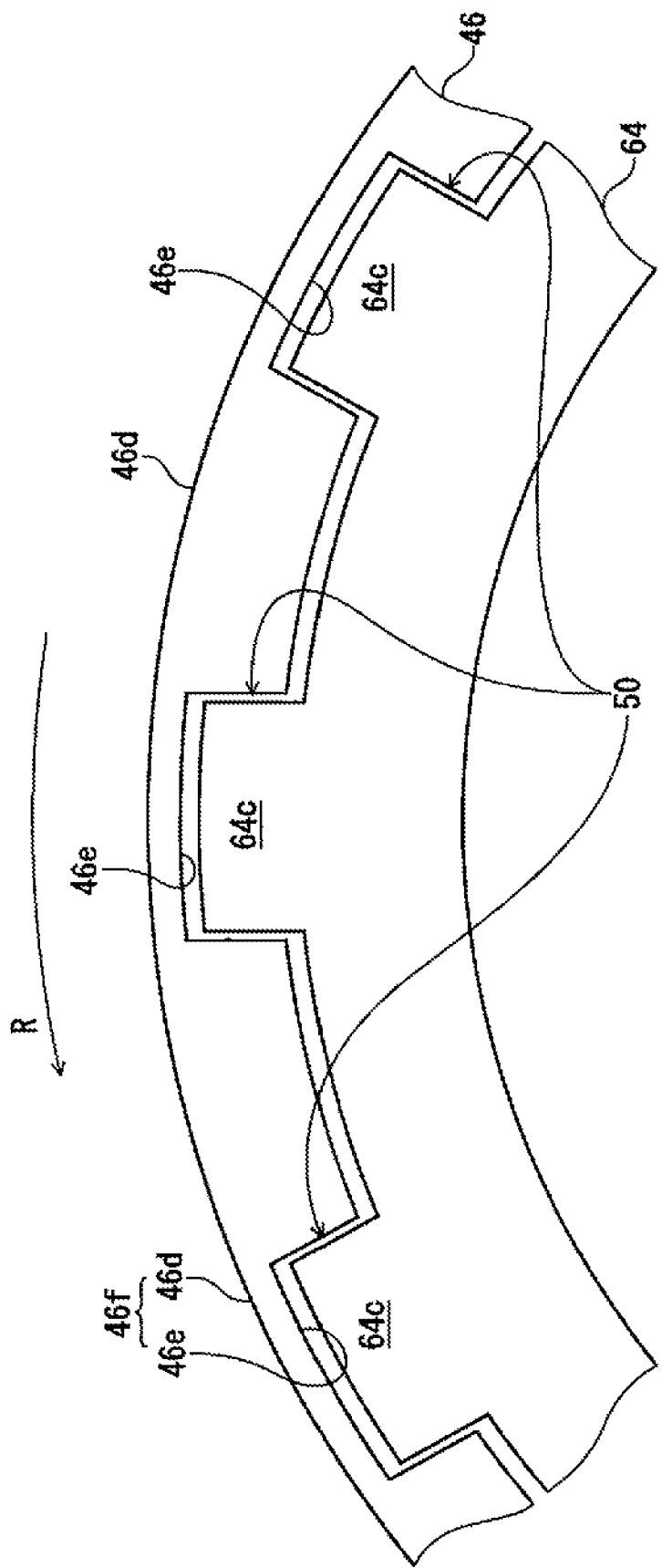
FIG. 7 is a schematic view illustrating arms and claws with which no off-spring is provided.
Figure 8:
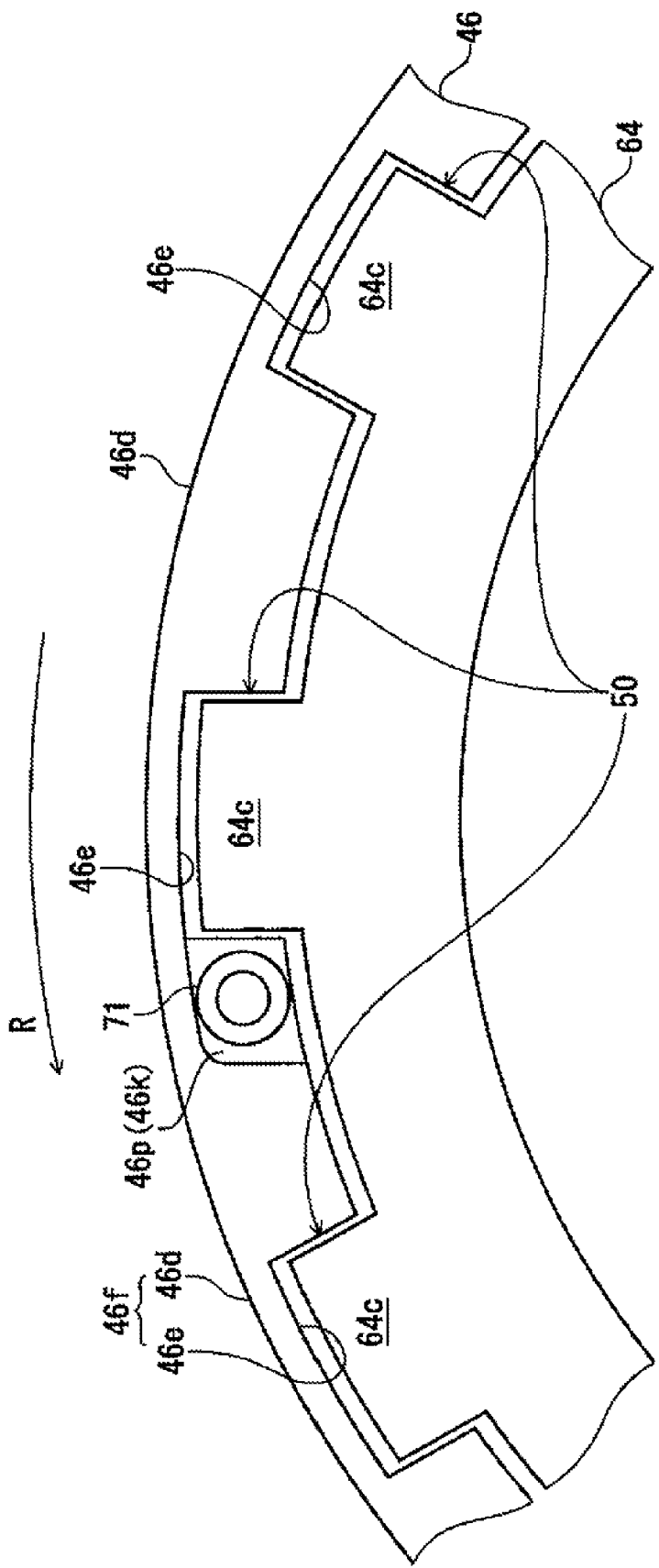
FIG. 8 is a schematic view illustrating the location of an off-spring.

Each of the friction plates 64 has substantially an annular shape (see FIGS. 7 and 8). Each of the friction plates 64 has a plurality of claws 64*c*. The claws 64*c* extend radially outwardly. Each of the friction plates 64 is attached to the clutch housing 46 by fitting the claws 64*c* into respective ones of the gaps 46*e* of the clutch housing 46. Thereby, each of the friction plate 64 rotates together with the clutch housing 46 as described above.

e. Pressure Plate

As illustrated in FIG. 3, a pressure plate 77 is arranged on the right side of the main shaft 33. The pressure plate 77 is formed in a substantially disk shape. A sub-clutch 100 is arranged in a center portion of the pressure plate 77. The radially outward end of the pressure plate 77 is attached to the arms 46*d*. The pressure plate 77 rotates together with the clutch housing 46.

A pressing part 77*b* projecting toward the plate group 66 side is formed in a radially outward portion of the pressure plate 77. This pressing part 77*b* faces the friction plate 64 located on the rightmost side of the plate group 66. When the pressure plate 77 moves to the left, the pressing part 77*b* presses the plate group 66 to the left. As a result, the friction plates 64 and the clutch plates 65 in the plate group 66 are brought into pressure contact with each other.

On the other hand, a cam face 81, which supports roller weights 41, is formed on the surface of the radially outward portion of the pressure plate 77 that is opposite to the plate group 66. A plurality of the cam faces 81 and the roller weights 41 are formed along the circumferential direction. The plurality of cam faces 81 are arranged radially from the axial center C of the main shaft 33. Each of the cam faces 81 is inclined to the right as it advances toward the radially outward edge thereof.

A roller retainer 78 is arranged on the right of the pressure plate 77. The roller retainer 78 faces the cam faces 81 of the pressure plate 77. As a result, a space 82 is formed by and between each cam face 81 and the roller retainer 78. The space 82 becomes narrower in width as it advances toward the radially outward edge of the main shaft 33.

Like the pressure plate 77, the radially outward end of the roller retainer 78 is attached to the plurality of arms 46*d*. Accordingly, the roller retainer 78 rotates together with the clutch housing 46. On the other hand, the roller retainer 78 can change its position along the axial direction with respect to the clutch housing 46.

The roller retainer 78 is urged to the left by a disc spring 83 serving as an urging member. The roller retainer 78 and the disc spring 83 constitute a touching member 70 for pushing the roller weights 41 against the cam faces 81.

The roller weights 41 are arranged respectively in a plurality of the spaces 82. The roller weights 41 whirl around in accordance with the rotation of the clutch housing 46, and move radially outwardly on the cam faces 81 by the centrifugal force produced at the time of the rotation. When the centrifugal force exceeds a predetermined value, the roller weights 41 receive a reaction force from the touching member 70, pressing the pressure plate 77 toward the plate group 66.

In the clutch 2, at least the touching member 70 and the cam faces 81 constitute a cam mechanism. The direction in which the roller weights 41 move in response to the centrifugal force is changed by the cam faces 81. When the roller weights 41 move radially outwardly in response to the centrifugal force, they come into contact with the touching member 70 and the cam faces 81, and the centrifugal force of the roller weights 41 is converted into a force along the lateral direction.

When the rotation speed of the crankshaft 32 is slower than a predetermined value, the rotation speed of the clutch housing 46 is also slower. For this reason, the centrifugal force that acts on the roller weights 41 is relatively small, and the roller weights 41 will sit relatively inward. Later-described off-springs 71 urge the pressure plate 77 in a direction opposite to the direction in which the plate group 66 is pressure-contacted. Therefore, when the roller weights 41 sit relatively inward, the resultant force of the force with which the roller weights 41 push the pressure plate 77 to the left and the urging force of the off-springs 71 will be substantially zero. As a result, the plate group 66 will be in a non pressure-contact state in which practically it is not pushed by the pressure plate 77. When in the non pressure-contact state, the torque of the clutch housing 46 will not be transmitted to the clutch boss 48, so the clutch 2 will be in a disengaged state.

On the other hand, when the rotation speed of the crankshaft 32 becomes relatively fast, the rotation speed of the clutch housing 46 will be also relatively fast accordingly. As the rotation speed of the clutch housing 46 increases, the centrifugal force acting on the roller weights 41 increases. When the centrifugal force acting on the roller weights 41 exceeds a predetermined value, the roller weights 41 move radially outward. As a result, the pressure plate 77 is pressed to the left by the roller weights 41, and moves toward the plate group 66. At this time, the urging force of the off-springs 71 becomes weaker than the force with which the roller weights 41 push the pressure plate 77 to the left. As a result, the plate group 66 is pressure-contacted, and thus, the clutch 2 will be in an engaged state.

When the plate group 66 is compressed and the clutch 2 is engaged in this way, the torque of the clutch housing 46 is transmitted to the clutch boss 48 via the plate group 66. As a result, the clutch boss 48 rotates together with the clutch housing 46.

On the other hand, when the rotation speed of the crankshaft 32 decrease while the clutch 2 is in an engaged state, the centrifugal force acting on the roller weights 41 will decrease. This moves the roller weights 41 radially inward. Thereby, the resultant force of the force with which the roller weights 41 push the pressure plate 77 to the left and the urging force of the off-springs 71 will be substantially zero. In other words, the force with which the pressure plate 77 presses the plate group 66 will become substantially zero. At this time, the plate group 66 is in a non pressure-contact state in which it is not substantially pressed by the pressure plate 7, and thus, the clutch 2 will be disengaged.

As described above, the motorcycle 1 is equipped with the centrifugal clutch 2. Therefore, at the time of starting or stopping the vehicle, the clutch 2 is automatically engaged/disengaged according to the rotation speed of the engine 4. Thus, operation of the clutch lever 24 is unnecessary. Thus, in the motorcycle 1 according to this embodiment, the rider's operation burden at the time of starting or stopping can be alleviated.

f. Off-Spring

The clutch 2 is equipped with the off-springs 71. The off-springs 71 adjust the force for compressing the plate group 66 by the pressure plate 77. In addition, the off-springs 71 urge the pressure plate 77 in a direction opposite to the direction in which the pressure plate 77 is pushed by the roller weights 41 and the Disc spring 83. Adjusting the force of compressing the plate group 66 by the pressure plate 77 enables adjustment of the engaged/disengaged point of the clutch 2 (the so-called meet point of the clutch).

Figure 4:
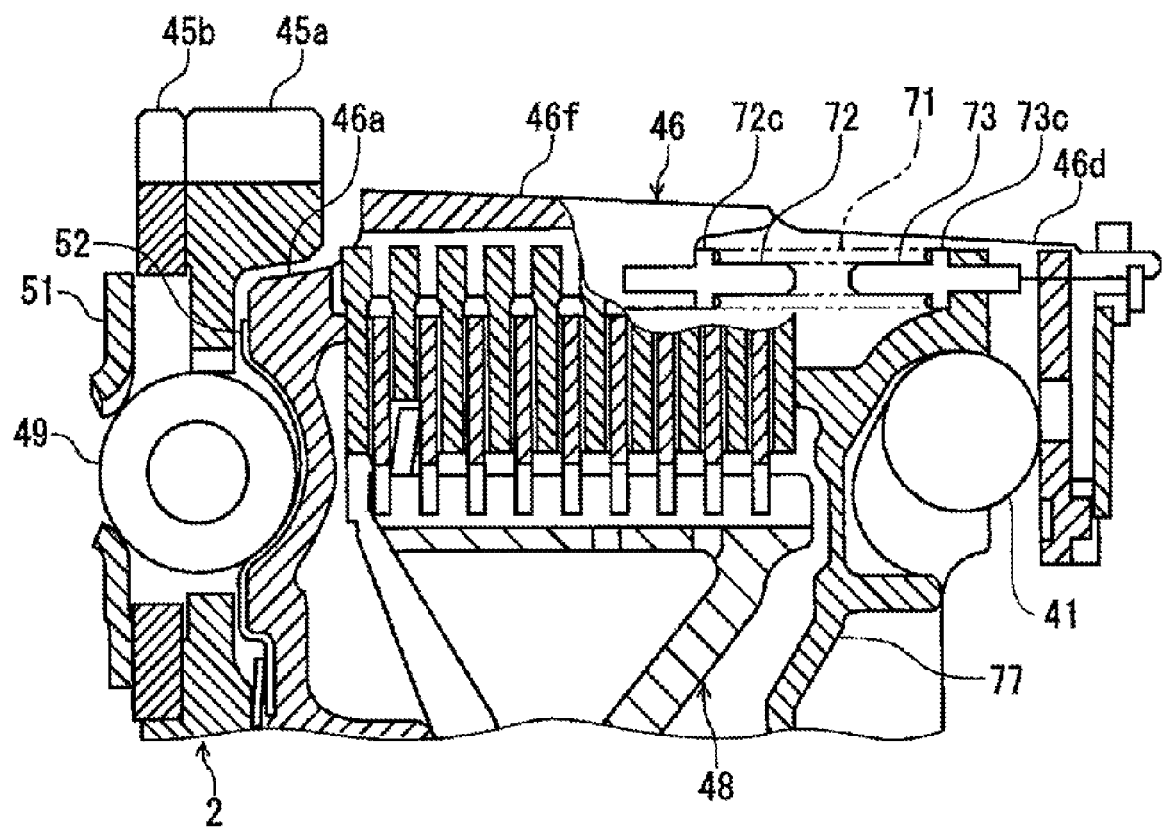
FIG. 4 is a partially enlarged cross-sectional view of the clutch.

In this embodiment, the clutch 2 is provided with a plurality of the off-springs 71. As illustrated in FIG. 4, the off-springs 71 are arranged in an outer rim portion 46f of the clutch housing 46. Specifically, the off-springs 71 are arranged in the gaps 46e of the clutch housing 46. The off-springs 71 extend substantially parallel to the direction in which the arms 46d extend. In other words, the off-springs 71 extend along the axial direction of the main shaft 33. The off-springs 71 are formed, for example, by coil springs. Illustration of the off-springs 71 is omitted in FIGS. 2 and 3.

As illustrated in FIGS. 5 and 6, some of the arms 46d have a notch portion 46k. The notch portion 46k is a portion of the arm 46d having a width narrower than that of the rest of the portion. As illustrated in FIG. 6, a support portion 46p extending along the circumferential direction is formed on the proximal end of the arm 46d that has the notch portion 46k. The support portion 46p is a surface that supports one end of the off-spring 71.

As illustrated in FIGS. 7 and 8, the claws 64c of the friction plates 64 are fitted in the respective gaps 46e of the clutch housing 46. Each of the arms 46d and each of the claws 64c come into contact with each other at the time of rotation of the clutch housing 46. The clutch housing 46 rotates in the direction R indicated in the drawings such as FIG. 7. Each of the arms 46d comes into contact with each of the claws 64c on a contact surface 50. A plurality of the contact surfaces 50 are formed corresponding to the plurality of arms 46d and the claws 64c. As illustrated in FIG. 8, the support portion 46p is adjacent to one of the claws 64c. The support portion 46p is provided on the opposite side of the contact surface 50 that is across the claw 64c. The support portion 46p is arranged on the side of the rotation direction R of the clutch housing 46 with respect to the claw 64c.

As illustrated in FIG. 5, the circumferential widths of the plurality of arms 46d are substantially identical in this embodiment. The term the width of the arm 46d herein means the width of the proximal part thereof. Likewise, the circumferential widths of the plurality of gaps 46e are substantially identical.

As illustrated in FIG. 5, the off-springs 71 are arranged at constant intervals along the circumferential direction. In other words, the off-springs 71 are arranged evenly along the circumferential direction. The virtual straight line L is a line that passes through the axial center C of the main shaft 33. The off-springs 71 are arranged symmetrically with respect to the virtual straight line L. The number of the arms 46d provided is 12. The number of the gaps 46e provided is also 12. One off-spring 71 is provided per four arms 46d, and three in total are provided. However, the total number of the off-springs 71 is not limited to three. The number of the off-springs 71 can be, for example, four, six or twelve. The numbers of the arms 46d and the gaps 46e are not limited to 12 either. The numbers of the arms 46d and the gaps 46e can be eight, for example. In this case, one off-spring 71 is provided per two arms 46d, and the total number thereof is four.

As illustrated in FIGS. 4 and 6, each of the off-springs 71 is arranged between a spring holder 72 and a spring holder 73, and extends along the axial direction. As illustrated in FIG. 6, the spring holder 72 is disposed on the support portion 46p. As illustrated in FIG. 4, the spring holder 73 is disposed on the pressure plate 77. The spring holders 72 and 73 have a base 72c and a base 73c, respectively. One end of the off-spring 71 is supported by the base 72c, and the other end is supported by the base 73c.

g. Sub Clutch

As illustrated in FIG. 3, the sub-clutch 100 is equipped with a friction plate 101, a first pressing plate 102 that faces a left side surface 101a (hereinafter referred to as the "first friction face") of the friction plate 101, and a second pressing plate 103 that faces a right side surface 101b (hereinafter referred to as the "second friction face") of the friction plate 101.

The friction plate 101 is configured to rotate together with the pressure plate 77. The pressure plate 77 is provided with a slide arm part 77c. On the other hand, a gap (not shown) is formed in a radially outward portion of the friction plate 101. The slide arm part 77c is attached to the gap of the friction plate 101. The friction plate 101 can slide along the axial direction with respect to the pressure plate 77.

The first pressing plate 102 is fixed to a short push rod 43a. Accordingly, the first pressing plate 102 is movable along the axial direction together with the short push rod 43a. In addition, the first pressing plate 102 rotates together with the short push rod 43a.

The second pressing plate 103 is serration-fitted to the short push rod 43a. For this reason, the second pressing plate 103 rotates together with the short push rod 43a, but the second pressing plate 103 is capable of relatively moving along the axial direction with respect to the short push rod 43a. The second pressing plate 103 has a boss portion 103a that extends to the right. This boss portion 103a rotatably supports the pressure plate 77 via a bearing 104. This allows the second pressing plate 103 and the pressure plate 77 to rotate relative to each other. The second pressing plate 103 and the pressure plate 77 are configured to move integrally along the axial direction.

When the short push rod 43a moves to the right, the first pressing plate 102 also moves to the right. Then, the first pressing plate 102 presses the friction plate 101 toward the second pressing plate 103. As a result, the friction plate 101 is sandwiched between the first pressing plate 102 and the second pressing plate 103. Thereby, the torque of the pressure plate 77 is transmitted to the first pressing plate 102 and the second pressing plate 103 via the friction plate 101, and the torque is applied to the first pressing plate 102 and the second pressing plate 103.

h. Force Boosting Mechanism

Figure 9A:
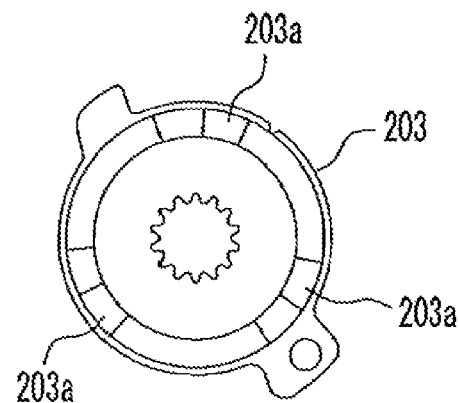
FIG. 9A is a back side view of a second cam plate.
Figure 9B:
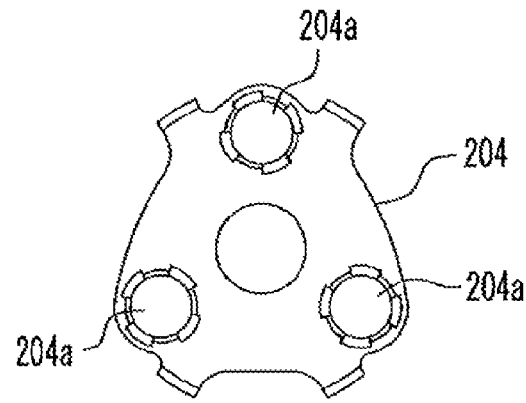
FIG. 9B is a front side view of a ball plate.
Figure 9C:
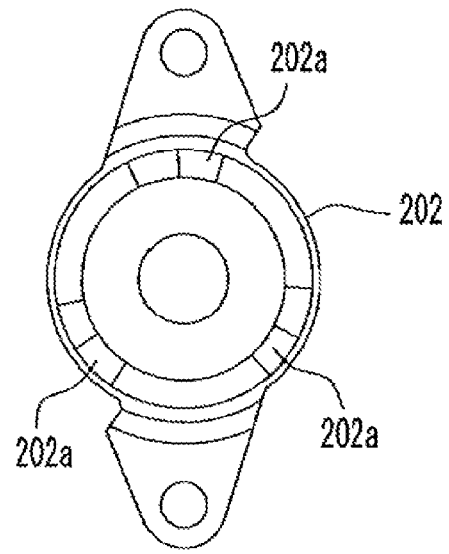
FIG. 9C is a front side view of a first cam plate.

As illustrated in FIG. 3, the clutch 2 has a force boosting mechanism 200. The force boosting mechanism 200 converts part of the torque of the pressure plate 77 into the force for disengaging the clutch 2. The force boosting mechanism 200 reduces the rider's force required for disengaging of the clutch 2. The force boosting mechanism 200 according to this embodiment is constructed by the so-called ball cam. The force boosting mechanism 200 includes a slide shaft 201 fixed to the second pressing plate 103, a first cam plate 202 (see FIG. 9C), a second cam plate 203 (see FIG. 9A), a ball plate 204 (see FIG. 9B), and a coil spring 205 that urges the second cam plate 203 in a direction in which the second cam plate 203 separates from the first cam plate 202. A supporting plate 250 that supports the coil spring 205 by contacting the right side part of the coil spring 205 is fixed to one end side of the slide shaft 201.

i. Clutch Release Mechanism

The clutch 2 is provided with a clutch release mechanism 86. The clutch release mechanism 86 forcibly releases the pressure contact state of the plate group 66 in response to the operation of the clutch lever 24 by the rider. This clutch release mechanism 8 enables disengagement of the clutch 2 by the rider's manual operation.

Operation of Clutch:

Next, the operation of the clutch 2 will be described. First, the operation for disengaging the clutch 2 will be described.

Figure 10:
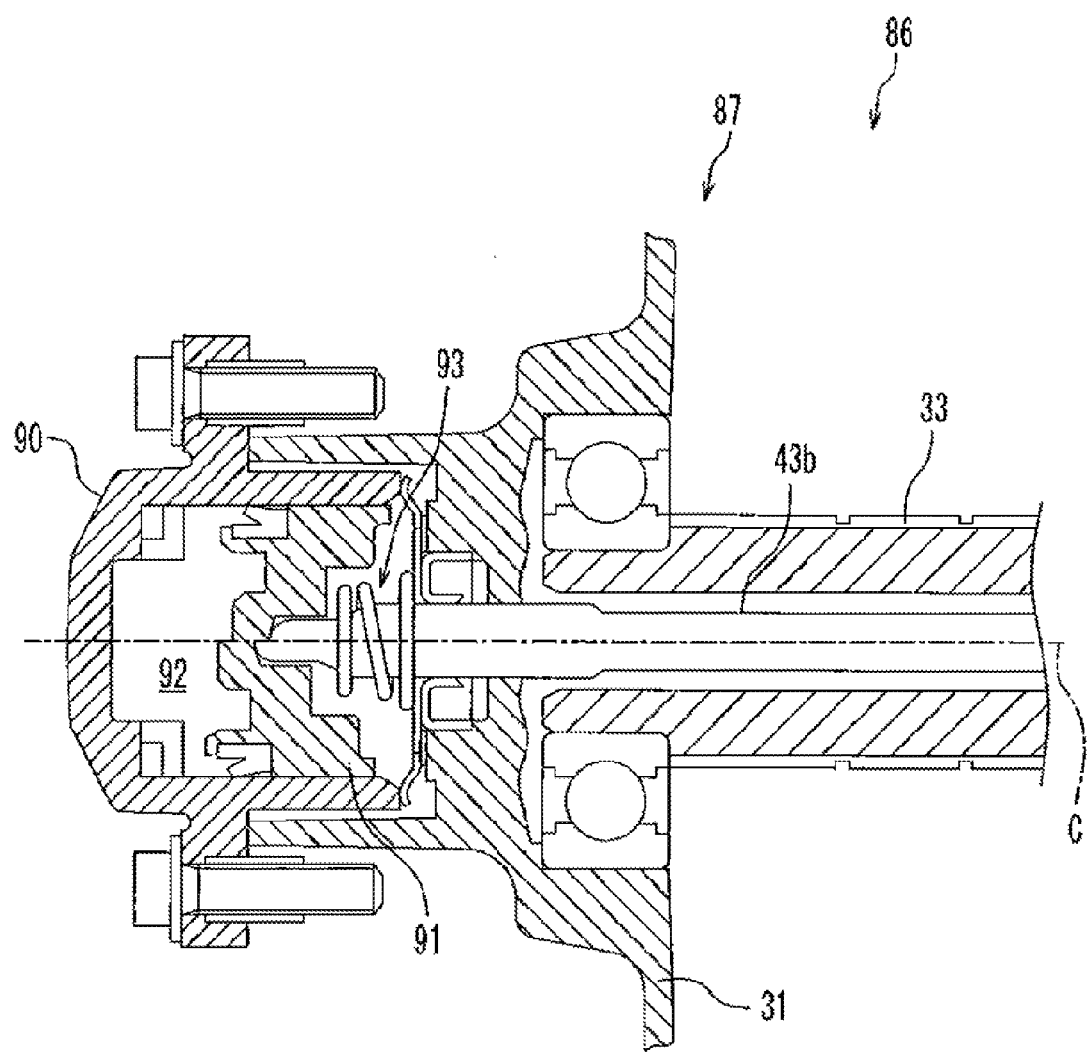
FIG. 10 is a cross-sectional view illustrating a push rod drive mechanism.

When the rider grips the clutch lever 24 (see FIG. 1), the internal pressure of an operation chamber 92 (see FIG. 10) of a drive mechanism 87 increases. As a result, a piston 91 inside a cylinder 90 moves to the right against the urging force of a spring 93, and a long push rod 43b also moves to the right. Then, a ball 43c and the short push rod 43a of a push mechanism 43 also move to the right, moving the first pressing plate 102 of the sub-clutch 100 to the right. Thereby, the friction plate 101 of the sub-clutch 100 is sandwiched between the first pressing plate 102 and the second pressing plate 103, causing the sub-clutch 100 to be in an engaged state. Then, the slide shaft 201 of the force boosting mechanism 200 rotates together with the pressure plate 77 in a predetermined direction.

When the slide shaft 201 rotates in the predetermined direction, the second cam plate 203 of the force boosting mechanism 200 will also rotate in the same direction. Then, balls 204a in the ball plate 204 move over from the space between a first cam face 202a and a second cam face 203a, causing the second cam plate 203 to be pushed to the right by the balls 204a. Thereby, the slide shaft 201 is also pushed to the right. As a result, the pressure plate 77 moves to the right because of the force with which the short push rod 43a pushes the pressure plate 77 to the right via the first pressing plate 102 and the friction plate 101, and the force with which the slide shaft 201 pulls the pressure plate 77 to the right via the second pressing plate 103 and the bearing 104. Thereby, the pressure contact state of the plate group 66 is released, and the clutch 2 is disengaged.

The second cam plate 203 is inhibited from rotating more than a given amount. For this reason, in the condition in which the clutch 2 is disengaged, the friction plate 101 rotates with respect to the first pressing plate 102 and the second pressing plate 103. In other words, the friction plate 101 slips with respect to the first pressing plate 102 and the second pressing plate 103 in the condition in which the clutch 2 is disengaged. However, oil is supplied to the first friction face 101a and the second friction face 101b of the friction plate 101, and therefore, wear of the friction plate 101 is controlled.

Hereinafter, the operation for engaging the clutch 2 will be described.

To engage the clutch 2, the rider releases the clutch lever 24. This reduces the internal pressure of the operation chamber 92 of the drive mechanism 87. This causes the piston 91 and the long push rod 43b to move to the left. Consequently, the ball 43c and the short push rod 43a also move to the left, and the first pressing plate 102 of the sub-clutch 100 accordingly moves to the left. This causes the first pressing plate 102 of the sub-clutch 100 to separate away from the friction plate 101. In addition, the second pressing plate 103 is no longer pushed rightward by the first pressing plate 102. Therefore, the rightward force against the slide shaft 201 is lost, and the second cam plate 203 that receives the urging force of the coil spring 205 rotates in the opposite direction, whereby the second cam plate 203 and the slide shaft 201 move to the left. As a result, the second pressing plate 103 also moves to the left.

Moreover, the rightward force by the first pressing plate 102 is released, the pressure plate 77 is moved to the left by the urging force of the disc spring 83. As a result, the pressure plate 77 compresses the plate group 66, allowing the clutch 2 to be engaged. In this case, the friction plate 101 of the sub-clutch 100 separates away from the second pressing plate 103.

The urging force that the pressure plate 77 receives from the disc spring 83 and the off-springs 71 varies depending on the radial positions of the roller weights 41. Specifically, when the rotation speed of the pressure plate 77 is fast, the roller weights 41 move radially outward. As a result, the roller weights 41 move to the right, causing the disc spring 83 to deform greatly. When the roller weights 41 move to the right, the pressure plate 77 compresses the plate group 66. This contracts the off-springs 71. As the off-springs 71 contract, the urging force thereof increases. Accordingly, the urging force that the pressure plate 77 receives from the disc spring 83 becomes relatively large even without making the elastic coefficient of the disc spring 83 large, because the disc spring 83 is deformed greatly by the roller weights 41 and the off-springs 71. On the other hand, when the rotation speed of the pressure plate 77 is slow, the roller weights 41 move radially inward. As a result, the roller weights 41 move to the left. At this time, the amount of shrinkage of the off-springs 71 is small. Therefore, the amount of deformation of the disc spring 83 is small. For that reason, the urging force that the pressure plate 77 receives from the disc spring 83 becomes relatively small.

When the engine rotation speed is high, the plate group 66 needs to be compressed by the pressure plate 77 with a large force. In the clutch 2 according to this embodiment, when the engine rotation speed becomes high, the amount of deformation of the disc spring 83 will become large in response to the radially outward movement of the roller weights 41. For this reason, a sufficient force can be obtained without increasing the elastic constant of the disc spring 83. Accordingly, the elastic constant, i.e., the spring capacity, of the disc spring 83 can be kept relatively small.

When the engine rotation speed is low, the roller weights 41 move radially inward, and the pressure plate 77 will not compress the plate group 66. In other words, the clutch becomes disengaged. When the engine rotation speed increases from an idle state, the roller weights 41 eventually move radially outward, causing the pressure plate 77 to compress the plate group 66. In other words, the clutch becomes engaged. However, in the clutch 2 according to this embodiment, the off-springs 71 urge the pressure plate 77 in a direction opposite to the direction in which the pressure plate 77 compresses the plate group 66. At the moment when the clutch is engaged, the engine rotation speed is not so fast and the amount of deformation of the disc spring 83 is also relatively small, so the force with which the pressure plate 77 compresses the plate group 66 is relatively small. Therefore, the plate group 66 is not compressed abruptly, and the clutch 2 is engaged smoothly.

In the clutch 2 of this embodiment, the off-springs 71 are arranged in the gaps 46e of the clutch housing 46. At least a space equal to the length of the arms 46d of the clutch housing 46 is ensured as the space for disposing the off-springs 71. Thus, it is possible to use relatively long off-springs 71. Therefore, it is possible to select the off-springs 71 with an appropriate size for adjusting the pressing force of the pressure plate 77.

In this embodiment, the support portions 46p for supporting the off-springs 71 are provided at the proximal ends of some of the arms 46d. The space for accommodating the off-springs 71, such as notches, is not provided in the friction plates 64. Therefore, there is no risk that the strength of the friction plates 64 may degrade. The friction plates 64 do not have a special shape for accommodating the off-springs 71. Therefore, the friction plates 64 may be used for other types of clutches that do not use the off-springs 71.

As illustrated in FIG. 8, the support portions 46p are formed at positions adjacent to the gaps 46e. When casting the clutch housing 46, the shape of the mold may be simplified since complicated parts in the mold can be eliminated. Therefore, the clutch housing 46 can be cast easily. Moreover, even in cases where the arms 46d of the clutch housing 46 are manufactured by a cutting process, the support portions 46p can be formed easily. As a result, the clutch housing 46 can be manufactured easily.

As illustrated in FIG. 8, the support portions 46p are arranged on the rotation direction side of the clutch housing 46 relative to the claws 64c of the friction plates 64. The claws 64c come into contact with the arms 46d on the contact surfaces 50, but not with the off-springs 71. Therefore, the strength of the clutch housing 46 is sufficiently ensured.

The widths of the plurality of arms 46d are substantially identical, and the widths of the plurality of the gaps 46e are substantially identical. A load that each of the arms 46d receives is made uniform, and the strength of the arms 46d is ensured sufficiently.

As illustrated in FIG. 5, the off-springs 71 are arranged at constant intervals along the circumferential direction. Thereby, the off-springs 71 can urge the pressure plate 77 in a well-balanced manner.

The number of the arms 46d is 12, and that of the off-springs 71 is 3. Thereby, the pressure plate 77 can be urged with sufficient balance by the off-springs 71, while inhibiting the shape of the clutch housing 46 from becoming complicated and preventing the parts count from increasing. In this way, it becomes possible to obtain the clutch 2 that is more suitable.

In this embodiment, the off-springs 71 are formed by coil springs. The coil spring is a relatively long elastic body; however, the clutch 2 can employ a relatively long elastic body, as mentioned above, so it can adopt the coil spring. Among well-known springs, a coil spring is simple in structure. By changing the number of coil turns and/or the coil diameter, the urging force of the off-spring 71 can be varied easily. Thus, selection of the off-springs 71 is made easy by the clutch 2 of this embodiment.

Modified Embodiment 1

Figure 11:
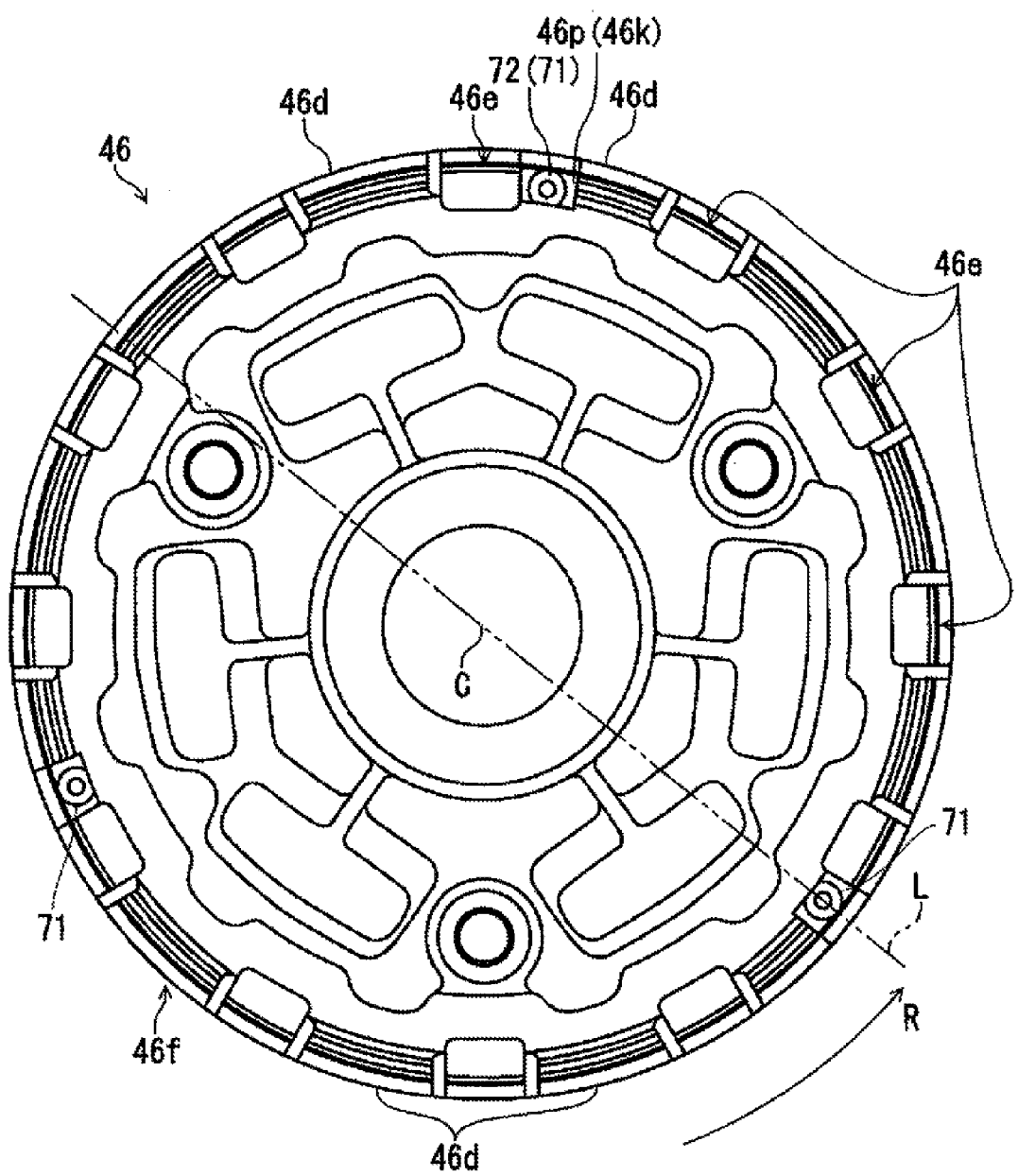
FIG. 11 is a front view of a clutch housing according to Modified Embodiment 1.
Figure 12:
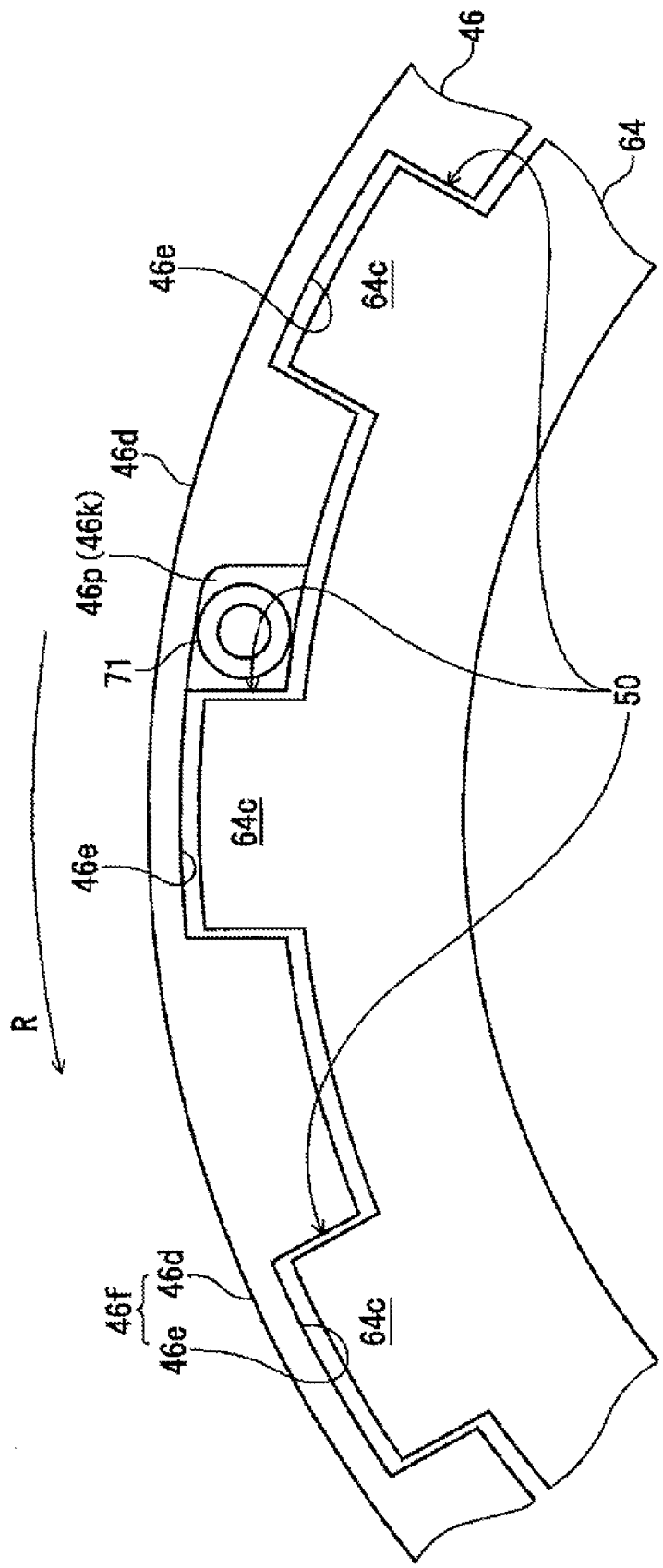
FIG. 12 is a schematic view illustrating the location of an off-spring in Modified Embodiment 1.

Hereinafter, a clutch 2 of Modified Embodiment 1 will be described. In this modified Embodiment, the support portions 46p are arranged on the opposite side of the rotation direction R of the clutch housing 46 with respect to the claws 64c, as illustrated in FIGS. 11 and 12. The claws 64c that are adjacent to the off-springs 71 are only some of the plurality of claws 64c. The number of the claws 64c that are adjacent to the off-springs 71 is three, and that of the other claws 64c is nine. The other claws 64c are fitted in the gaps 46e. As a result, the friction plates 64 do not move greatly with respect to the clutch housing 46. Moreover, sufficient spaces are provided between the off-springs 71 and the claws 64c. For this reason, in this modified Embodiment as well, the off-springs 71 and the claws 64c do not come in contact with each other.

Modified Embodiment 2

Figure 13:
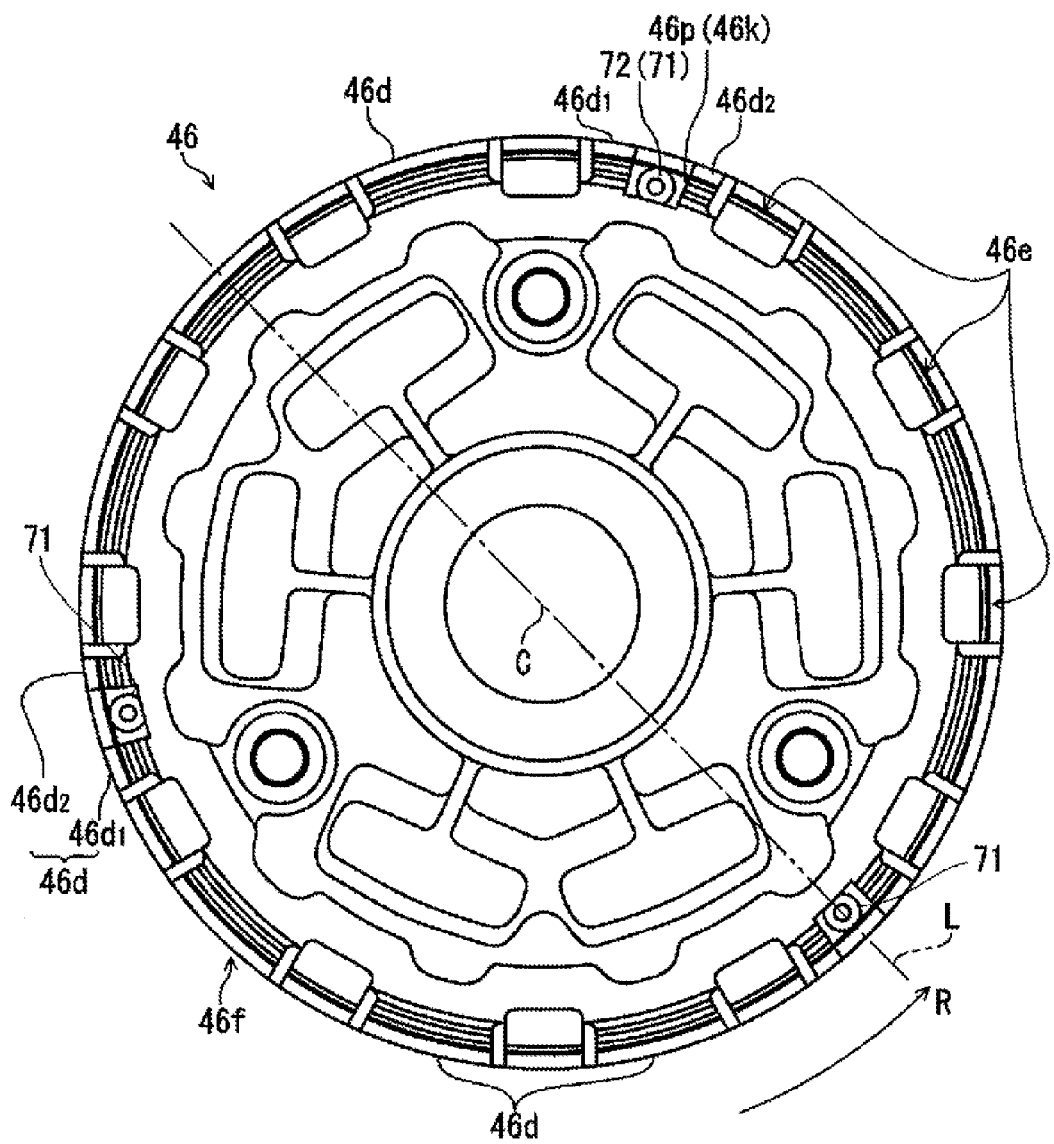
FIG. 13 is a front view of a clutch housing in Modified Embodiment 2.
Figure 14:
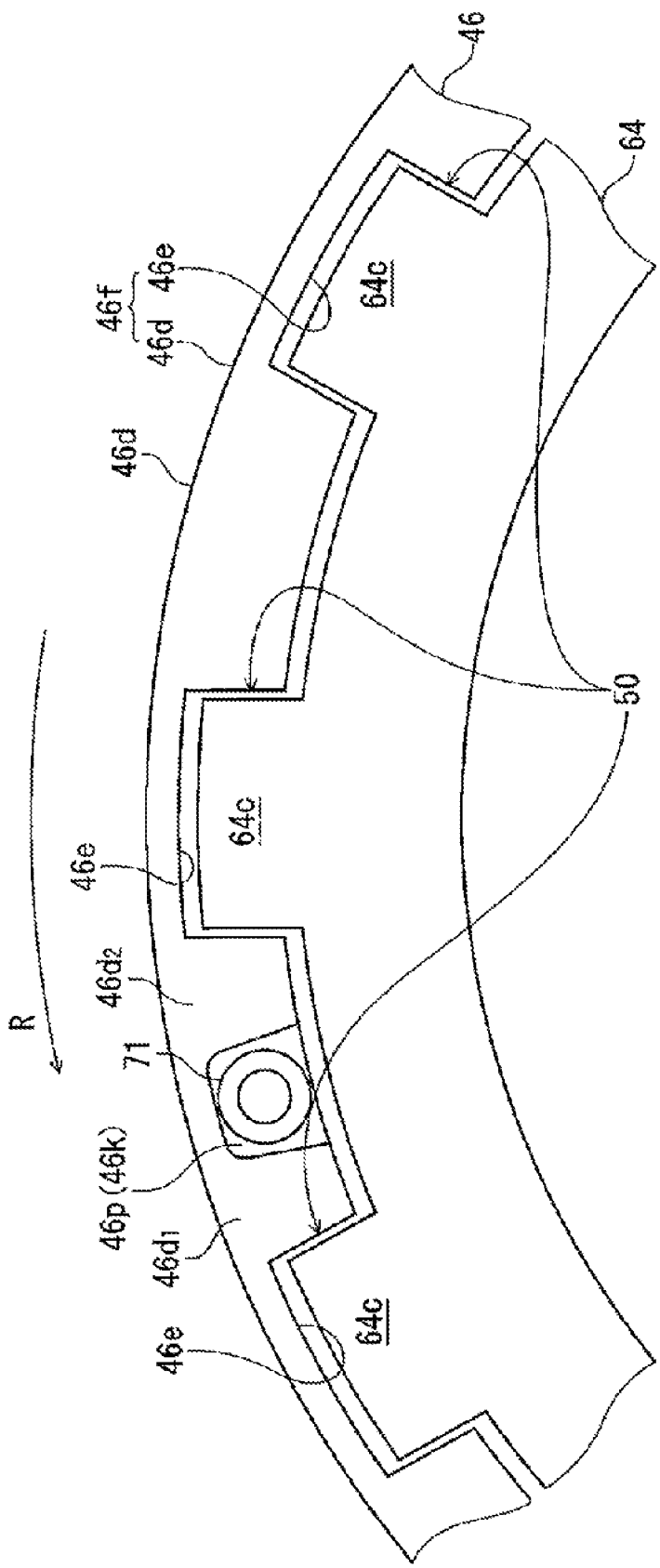
FIG. 14 is a schematic view illustrating the location of an off-spring in Modified Embodiment 2.

In this modified Embodiment, each support portion 46p is arranged at an intermediate position between two of the adjacent arms 46d, as illustrated in FIGS. 13 and 14. The arms 46d$_1$ and 46d$_2$ on both sides of each support portion 46p have narrower widths than the other arms 46d. In other words, the notch portion 46k is formed in the central part of the arm 46d, and the support portion 46p is formed in this notch portion 46k. The off-springs 71 are not adjacent to the claws 64c of the friction plates 64. For this reason, interference between the off-springs 71 and the claws 64c is prevented reliably.

Modified Embodiment 3

Figure 15:
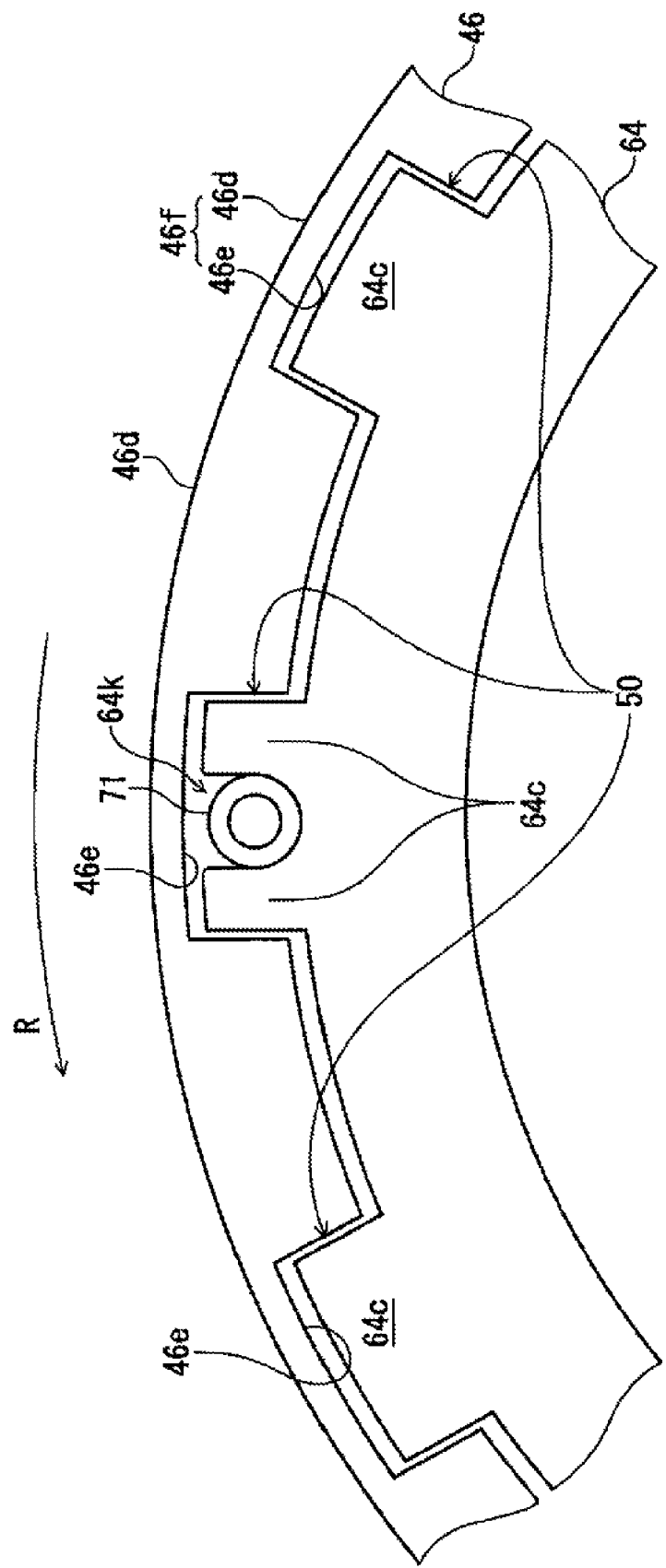
FIG. 15 is a schematic view illustrating the location of an off-spring in Modified Embodiment 3.

In this modified Embodiment, some of the claws 64c have a notch portion 64k, as illustrated in FIG. 15. The notch portion 64k is formed substantially at the center of the claw 64c. Each of the off-springs 71 is arranged in a respective one of the notch portions 64k, and extends along the axial direction. In the clutch 2 of this modified Embodiment, the notch portion 46k is not formed in the arm 46d. This enables the arms 46d to have a great strength. As a result, the strength of the clutch housing 46 can be increased. Therefore, the clutch housing 46 of this modified Embodiment can be used commonly with the clutch that does not use the off-springs 71.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A centrifugal multi-plate friction clutch comprising:
a clutch shaft;
a clutch boss attached to the clutch shaft;
a clutch housing including a bottom portion in a closed-end cylindrical shape surrounding the clutch boss, a plurality of arms extending along an axial direction of the clutch shaft from the bottom portion and provided along a circumferential direction centering on the axial center of the clutch shaft, and a plurality of gaps each formed between the arms that are adjacent to each other along the circumferential direction, the clutch housing being configured to rotate in the circumferential direction;
a plurality of first plates attached to the clutch boss and arranged along the axial direction;
a plurality of second plates attached to the clutch housing and arranged along the axial direction alternately with the plurality of first plates;
centrifugal weights configured to receive centrifugal force by rotating with the clutch housing and move in a direction away from the axial center of the clutch shaft;
a cam mechanism for converting the centrifugal force into a force in the axial direction by contacting with the centrifugal weights;
a pressure plate configured to move toward one side in the axial direction by receiving the force in the axial direction to make the first plates and the second plates come into contact with one another;
a clutch release mechanism for moving the pressure plate toward the other side in the axial direction;
a clutch operator for operating the clutch release mechanism; and
a plurality of elastic bodies arranged in the gaps of the clutch housing for urging the pressure plate toward the other side in the axial direction; wherein
each of the second plates has a plurality of claws extending radially outwardly, and each of the second plates is attached to the clutch housing by fitting the plurality of claws into respective ones of the plurality of gaps; and
wherein support portions, each extending along the circumferential direction and supporting one end of the elastic body, are provided at proximal end portions of some of the plurality of arms.

2. The centrifugal multi-plate friction clutch according to claim 1, wherein the support portions are adjacent to the claws of the second plates along the circumferential direction.

3. The centrifugal multi-plate friction clutch according to claim 2, wherein the support portions are arranged on a rotation direction side of the clutch housing with respect to the claws of the second plates.

4. The centrifugal multi-plate friction clutch according to claim 1, wherein each of the support portions is provided at an intermediate position between two of the arms adjacent to each other.

5. The centrifugal multi-plate friction clutch according to claim 1,
wherein widths of the plurality of arms are substantially identical, and widths of the plurality of gaps are substantially identical.

6. The centrifugal multi-plate friction clutch according to claim 1, wherein the plurality of elastic bodies are arranged at constant intervals along the circumferential direction.

7. The centrifugal multi-plate friction clutch according to claim 6, wherein the number of the arms is 12, and the number of the elastic bodies is 3.

8. The centrifugal multi-plate friction clutch according to claim 1, wherein each of the elastic bodies is a coil spring extending along the axial direction.

9. The centrifugal multi-plate friction clutch according to claim 1, wherein the clutch operator is a clutch lever provided on a handle bar of a motorcycle.

10. A centrifugal multi-plate friction clutch comprising:

a clutch shaft;

a clutch boss attached to the clutch shaft;

a clutch housing including a bottom portion in a closed-end cylindrical shape surrounding the clutch boss, a plurality of arms extending along an axial direction of the clutch shaft from the bottom portion and provided along a circumferential direction centering on the axial center of the clutch shaft, and a plurality of gaps each formed between the arms that are adjacent to each other along the circumferential direction, the clutch housing being configured to rotate in the circumferential direction;

a plurality of first plates attached to the clutch boss and arranged along the axial direction;

a plurality of second plates attached to the clutch housing and arranged along the axial direction alternately with the plurality of first plates;

centrifugal weights configured to receive centrifugal force by rotating with the clutch housing and move in a direction away from the axial center of the clutch shaft;

a cam mechanism for converting the centrifugal force into a force in the axial direction by contacting with the centrifugal weights;

a pressure plate configured to move toward one side in the axial direction by receiving the force in the axial direction to make the first plates and the second plates come into contact with one another;

a clutch release mechanism for moving the pressure plate toward the other side in the axial direction;

a clutch operator for operating the clutch release mechanism; and a plurality of elastic bodies arranged in the gaps of the clutch housing for urging the pressure plate toward the other side in the axial direction; wherein each of the second plates has a plurality of claws extending radially outwardly, and each of the second plates is attached to the clutch housing by fitting the plurality of claws into respective ones of the plurality of gaps; wherein some of the plurality of claws has a notch portion; and wherein each of the elastic bodies is arranged in the notch portion.

\* \* \* \* \*